March 13, 1962 L. J. BLOECHL 3,025,512
CHANGEABLE INDICATORS FOR DISPLAY DEVICES
Filed July 1, 1959 3 Sheets-Sheet 1

INVENTOR.
L.J. BLOECHL
BY
*Forest B. Hitchcock*
HIS ATTORNEY

March 13, 1962 L. J. BLOECHL 3,025,512
CHANGEABLE INDICATORS FOR DISPLAY DEVICES
Filed July 1, 1959 3 Sheets-Sheet 2

*INVENTOR.*
L.J.BLOECHL
BY
Forest B. Hitchcock
HIS ATTORNEY

March 13, 1962  L. J. BLOECHL  3,025,512
CHANGEABLE INDICATORS FOR DISPLAY DEVICES
Filed July 1, 1959  3 Sheets-Sheet 3

INVENTOR.
L.J. BLOECHL
BY
Forest B. Hitchcock
HIS ATTORNEY

United States Patent Office 3,025,512
Patented Mar. 13, 1962

3,025,512
CHANGEABLE INDICATORS FOR DISPLAY DEVICES
Ludwig J. Bloechl, Rochester, N.Y., assignor to General Railway Signal Company, Rochester, N.Y.
Filed July 1, 1959, Ser. No. 824,272
3 Claims. (Cl. 340—373)

This invention relates to changeable indicators for display devices, and more particularly relates to an indicator which may be electrically operated to either one of two positions and be retained in its last operated position when energy is removed.

In display boards or signs, such as may be used at airports, vehicle terminals or on highways or the like, it is desirable to be able to visibly display certain information such as weather conditions, departure times and the like, either for the benefit of the public or the operational personnel. As the information to be displayed is of a changeable nature, the display device must be able to actually change to different alphabetical letters and numerical figures to form different words and numbers.

The present invention contemplates a changeable indicator which may be mounted in pluralities on a panel which in itself forms a character unit, several of such character units to be mounted on a display board as required. Each character unit would form a certain letter or number depending upon which of certain ones of the changeable indicators were energized to change their positions.

More specifically, each character unit panel is substantially rectangular in shape to provide more height than width, and is provided with a series of round openings spaced adjacently in horizontal and vertical alignment. A changeable indicator of the present invention is mounted on the rear face of the panel and directly behind each opening. The movable unit of the changeable indicator is a rotatably mounted ball which, by way of example, would have one black hemisphere and the other hemisphere would be white. It should be understood that other color combinations could be used as desired, but black and white has been chosen herein for illustrative purposes.

Assuming that the panel is black in color, in the normal position of the changeable indicator the black portion of the ball would appear in the panel opening, so that in appearance the panel would show all black with no indications visible. When certain of the changeable indicators are energized, their respective balls would rotate and the white portion of the balls would be visible in the panel openings to indicate in white against a black background, a numeral "2" or a letter "B" or the like as called for, and thus form one character unit. With several such character units on each display board, it can be understood that various words or numbers could be displayed.

With more particular reference to the changeable indicator of the present invention, the operational structure compirses an electromagnetic device capable of being energized by opposite polarities to change the direction of the flow of flux through the core structure in order to change the direction of movement of its armature. The armature comprises a permanent magnet which is molded within a plastic ball which in turn is rotatably mounted so that the poles of the permanent magnet magnetically cooperate with the pole piece of the core of the electromagnetic device.

When the electromagnetic device is energized by current of one polarity the permanent magnet armature will rotate and cause the indicator ball to display a black aspect. When energized with the opposite polarity, the ball will be caused to rotate in the opposite direction to display a white aspect. When all energy is removed, the attraction of the permanent magnet alone to the pole piece of the electromagnetic device will hold the ball in its last operated position.

The electromagnetic structure of the changeable indicator of the present invention may assume various forms and two such forms have been illustrated herein. In the first form of the invention the electromagnetic structure also serves as a supporting structure and is provided with a single pole. In the second form of the invention the electromagnetic structure is mounted on a separate nonmagnetic supporting structure and is provided with two poles.

In both of these forms of the invention, the core of the electromagnetic structure may be provided with either one or two coil windings as desired. When a single coil winding is provided, it is capable of being energized by current of opposite polarities to cause a flow of flux in either of two directions to polarize the core with the desired polarity to operate the indicator ball to the desired position. When two coil windings are provided, the core can be polarized with the desired polarity by energizing one coil or the other.

The changeable indicators of the present invention may be mounted on a panel in any suitable manner but preferably a quick detachable mounting means is desirable. Alhough such a detachable mounting may assume various forms, each form of the invention illustrates a quick detachable mounting means wherein a changeable indicator may be mounted on the back of a panel merely by sliding it into and out of position and wherein it is held in its mounted position by a spring biasing means.

Although the display board would normally be visible in daylight and lighted up by floodlights at night, it is also proposed to provide the changeable indicator ball with a luminescent reflective type of paint covering or the like on its white aspect hemisphere to aid visibility in darkness.

Other objects, purposes and characteristic features of the present invention will be pointed out as the description of the invention progresses, with reference to the accompanying drawings, in which.

Figure 10:
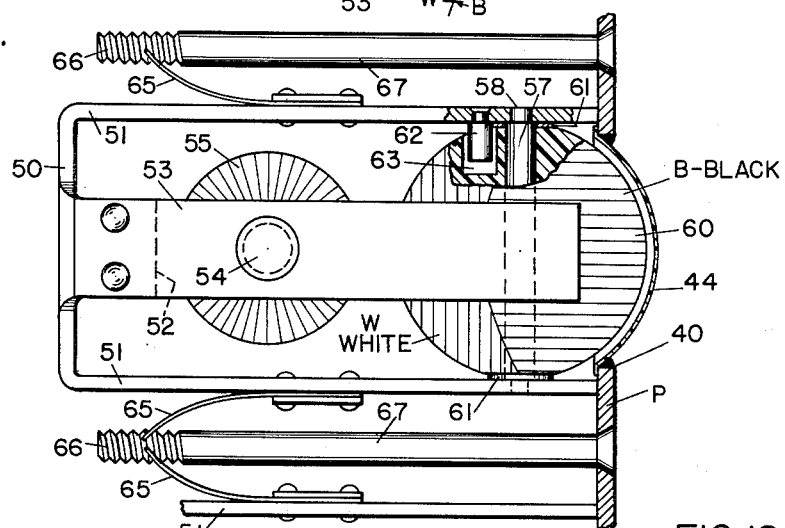
FIG. 10 is a side elevation view of the changeable indicator of the second form of the present invention and is shown partially in cross section and also shows the manner in which it is mounted to the character unit panel.
Figure 11:
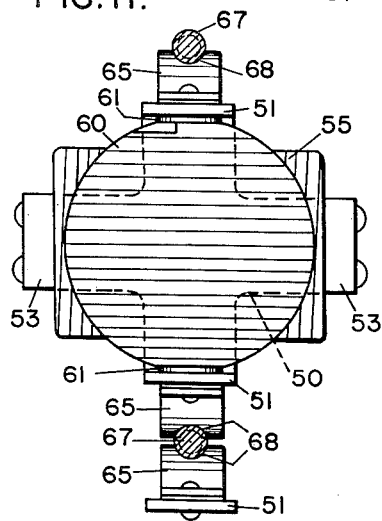
Figure 12:
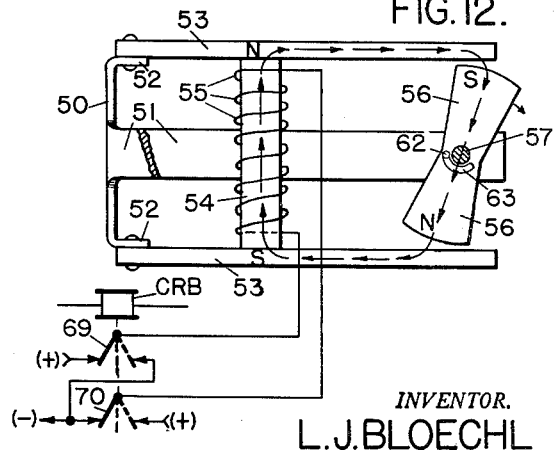

FIG. 11 is a front end view of the apparatus shown in FIG. 10 with the character unit panel removed and the mounting pins shown in cross section; and FIG. 12 is a fragmentary diagrammatic view of the magnetic structure of the changeable indicator of the second form of the present invention shown in its normal black indicating position and shown in the single coil winding form of the invention with a means for controlling the energization thereof.

Referring now more particularly to FIGS. 1-4 inclusive, the changeable indicator device of the first form of the invention comprises a U shaped frame member 11 of soft iron or other suitable magnetic material which also serves as a yoke member for the magnetic structure. Extending from the base portion of the yoke frame member 11 in a plane parallel to the leg portions thereof is a core 12. This core 12 is fastened to the base portion at its threaded end by means of a nut 13 and has an enlarged pole piece 14 at its other end. Located on the core 12 between the base portion of the yoke 11 and the pole piece 14 is a coil winding 15.

Extending transversely between the free ends of the leg portions of the yoke or frame member 11 is pin 16. This pin 16 extends through holes in the frame member 11 and is held in position by means of split spring washers 17 which snap into grooves in the pin 16. Rotatably mounted on the pin 16 is a molded plastic sphere or ball 18 which is made of nylon or some other suitable hard plastic material. A thrust bearing washer 19 is located on the pin 16 between the ball 18 and the frame member 11 on the lower side of the ball to provide a suitable thrust bearing surface on which the ball 18 rests. The ball 18 is provided with a radially extending pin 20 which cooperates alternately with stop pins 21 and 22 which are mounted in the frame member 11. These stop pins 21 and 22 provide limitations for the movement of the ball 18 to its extreme rotated positions for reasons to be explained hereinafter.

The movable armature member of the electromagnetic structure comprises a permanent magnet 25 which in assembly is molded within the plastic ball 18 in a centrally located balanced position. As shown more particularly in FIGS. 3 and 4, this permanent magnet armature 25 is suitably shaped and so positioned that its pole ends 26 and 27 extend radially from the axis of the ball 18 to its outer periphery. In operation, a particular pole end 26 or 27 of the armature 25 is attracted to the pole piece 14 of the electromagnetic structure in accordance with the polarity of the flux induced into the core structure 12. This causes the armature 25 and its associated ball 18 to rotate in a particular direction, all as will be explained more in detail hereinafter. The armature 25 is provided with a clearance hole 28 therethrough at its axis to provide a clearance for the pin 16 to pass therethrough.

Figure 1:
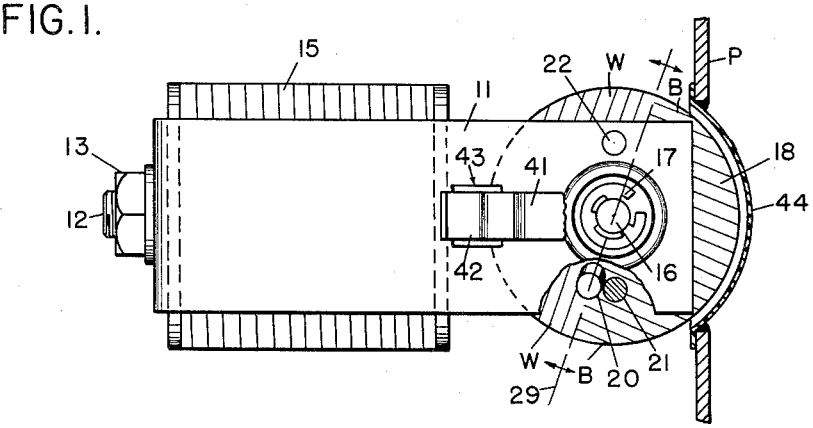
FIG. 1 is a top plan view of the changeable indicator of the first form of the present invention and is shown partially broken away and in relationship to the character unit panel to which it is mounted, the panel being shown in cross section.
Figure 2:
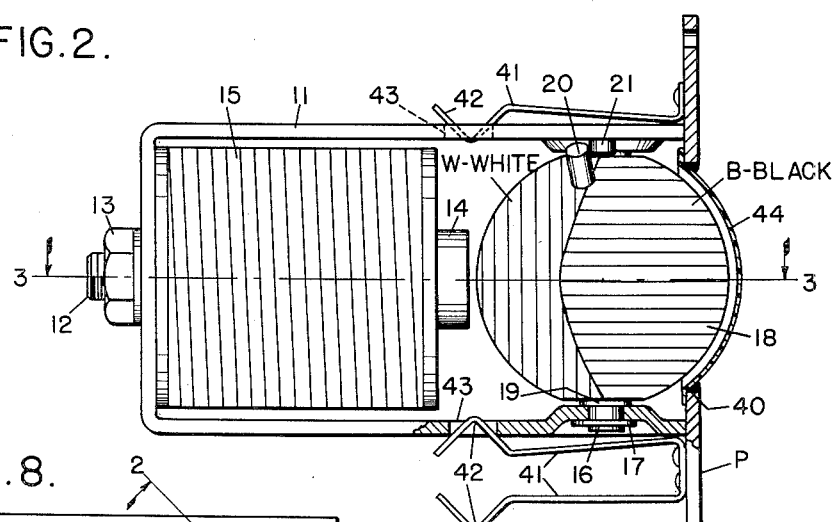
FIG. 2 is a side elevation view taken along line 2—2 of FIG. 8 of the changeable indicator of the first form of the present invention and is shown partially in cross section and also shows the manner in which it is mounted to the character unit panel.
Figure 3:
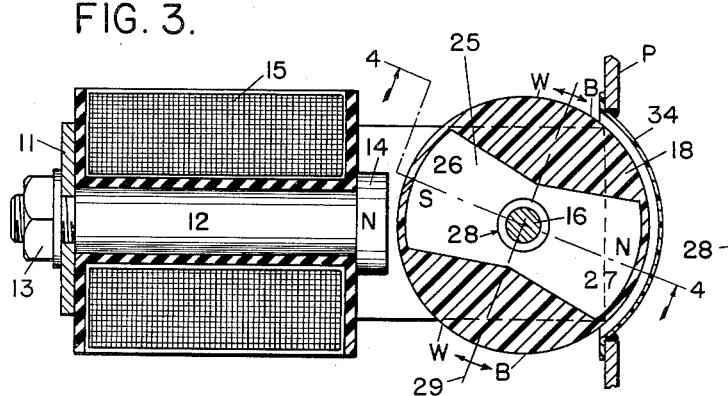
FIG. 3 is a top plan section view of the apparatus shown in FIG. 2 as taken substantially on the line 3—3 of FIG. 2 as viewed in the direction of the arrows.

The purpose of rotating the ball 18 is to provide two different indications, and in this particular application of the invention, this is accomplished by displaying two different achromatic colors, one on each hemisphere of the ball 18. As shown in FIGS. 1, 2 and 3, the ball 18 is theoretically bisected by a dash line 29 which is shown extending through the ball 18 at right angles to the longitudinal centerline of its armature 25. The hemisphere B on one side of the dash line 29 is black whereas the hemisphere W on the other side of the dash line is white. In practice, the changeable indicator device of the present invention is mounted on the back surface of a panel which has a round opening therein through which a portion of the ball 18 may protrude so as to be visible on the front of the panel. Thus, either the black or the white aspect is visible depending upon the operated position of the ball 18, as will be explained more in detail hereinafter.

Figure 5:
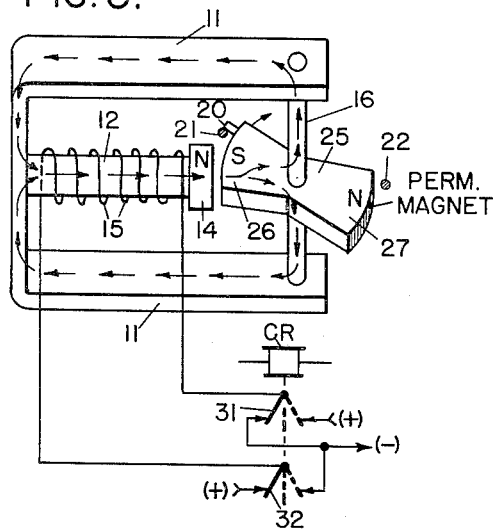
FIG. 5 is a fragmentary diagrammatic view of the magnetic structure of the changeable indicator of the first form of the present invention shown in its normal black aspect position and shown in the single coil winding form of the invention with a means for controlling the energization thereof.
Figure 6:
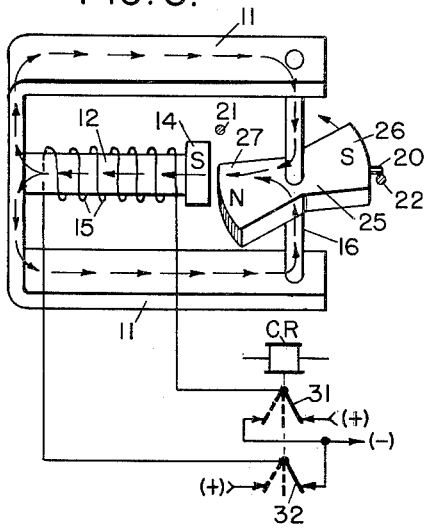
FIG. 6 is a view similar to FIG. 5 except that the device has been shown in its operated white indicating position.

Referring now to the mode of operation of the changeable indicator device of the first form of the present invention, FIGS. 5 and 6 illustrate a schematic showing of the magnetic structure of the device in its two different operated positions and typical energizing circuits therefor. The plastic ball 18 which surrounds the permanent magnet armature 25 has been omitted for purpose of illustration, it being understood that, as a single unit, they are positioned together. It should also be noted that when the armature 25 is in either of its fully operated stop positions, the center of its cooperating pole ends 26 or 27, as the case may be, is not in line with the center of the core pole piece 14. This is done to produce better operating characteristics and faster movement of the armature 25 when the coil 15 is energized with a current of the proper polarity. If the poles were in concentric alignment, the magnetic forces would tend to push straight away towards the bearing pin 16 rather than rotate the armature 25 around the bearing pin 16. As previously mentioned and shown in FIGS. 1, 2 and 3, the stop positions of the armature 25 are approximately twenty degrees out of concentric alignment with the center line of the core 12, so that the total movement of the armature 25 and its associated indicator ball 18 is through an arc of approximately one hundred and forty degrees, as determined by the location of the stop pins 21 and 22.

As shown in FIG. 5, there has been illustrated a three position polar control relay CR having two contacts 31 and 32 operated to their left-hand positions by reason of the polarity of the current passing through the winding of the relay CR. With the contacts 31 and 32 in their left-hand positions, an energizing circuit for the coil winding 15 of the indicator device was completed which caused a magnetic flux movement through the core 12 and the pole piece 14 in the direction indicated by the arrows from the south pole end 26 of the permanent magnet armature 25 to the pole piece 14. Thus, the armature 25 was rotated in a counter clockwise direction until the limiting pin 20 was in contact with the stop pin 21, thus positioning the armature 25 and its associated indication ball 18 in what is assumed to be its normal black indication position.

As the armature 25 is in itself a permanent magnet having a north pole and a south pole, its attracted position is governed by the polarity induced into the pole piece 14, the opposite polarity pole end of the permanent magnet always being the one attracted thereto. The permanent magnet feature of the armature 25 also acts as a magnetic hold to retain the armature 25 in its last operated position when energizing current is removed from the winding of the relay CR. Under such conditions, the permanent magnet will remain attracted to the pole piece 14 until such a time as it is desired to operate the armature 25 to its other extreme position.

Assuming now that the polarity of the energizing current passing through the winding of the control relay CR was reversed, its contacts 31 and 32 would be operated to their right-hand positions as shown in FIG. 6. This would cause the magnetic flux movement through the core 12 and the pole piece 14 to be reversed and in a direction as indicated by the arrows, and change the polarity of the pole piece 14. Thus, the pole piece 14 would oppose and repel the south pole end 26 of the permanent magnet armature 25 and attract its north pole end 27 and cause the armature 25 to rotate clockwise to its other position as determined by the limiting pin 20 and the stop pin 22. Again, when energy is removed from the winding of the control relay CR, the permanent magnet armature 25 would remain in its then operated position due to its normal magnetic attraction to the pole piece 14.

Figure 7:
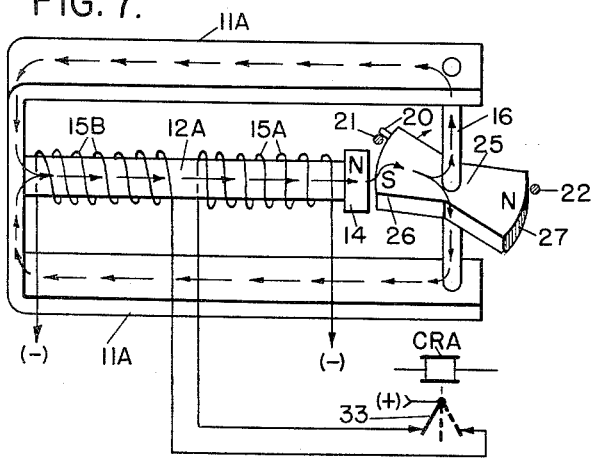
FIG. 7 is a view similar to FIG. 5 except that it shows the double coil winding form of the invention with a means for controlling the energization thereof.

In FIG. 7 there has been shown a slight modification of the first form of the invention wherein there are two separate coil windings 15A and 15B mounted on a lengthened core 12A which is attached to a lengthened yoke or frame member 11A. Otherwise, the structure of the changeable indicator is the same as that shown in the single coil winding form of the invention.

In operation, when the three position polar control relay CRA is operated to one position as shown, its contact 33 will close a circuit to energize the coil 15A to cause a magnetic flux movement through the core 12A etc., as indicated by the arrows to operate the permanent magnet armature 25 to one position. When the relay contact 33 is operated to its other right-hand position a circuit is closed to energize the other coil 15B, thus reversing the magnetic flux movement through the core 12A etc., and causing the armature 25 to be rotated to its other position, all much the same as described in detail in connection with the single coil winding form of the invention.

By way of example for the purpose of illustrating the utility of the invention, there has been shown on the drawings a typical character unit panel (see FIG. 8) and one form of an appropriate means for mounting a changeable indicator of the present invention thereto (see FIG. 2). It is proposed that each panel unit P be substantially rectangular in shape, the heighth being greater than the width. The panel P may be metal or any other suitable material and its front face portion is preferably black. As shown, there are thirty-five round openings 40 in the panel equally spaced in vertical and horizontal alignment.

Figure 8:
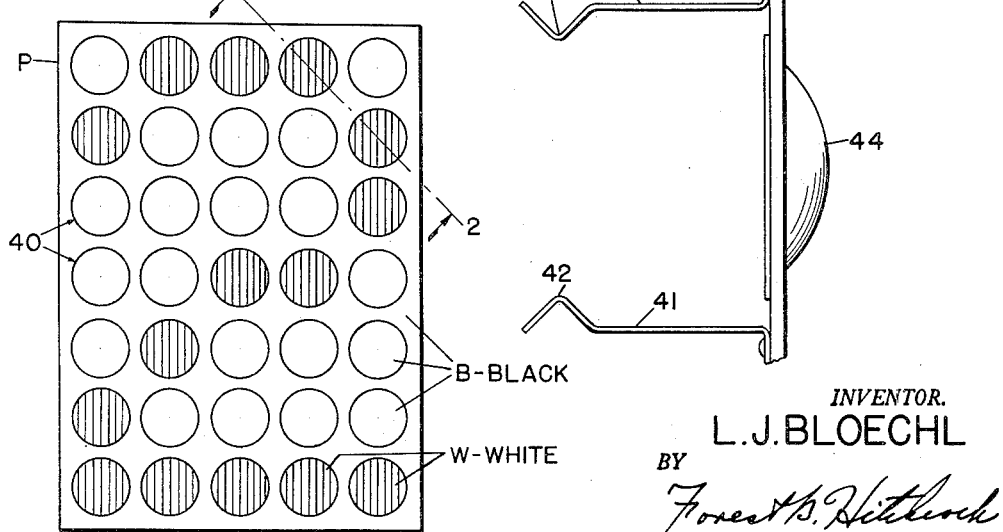
FIG. 8 is a front view of a typical character unit panel and by way of an example shows a character unit "2" indicated thereon by reason of certain of the changeable indicators having been operated to their white indication positions.

The changeable indicators are mounted behind the several openings 40 and when in their normal positions, the black aspect hemispheres B of the balls 18 would appear in the openings 40, thus displaying black aspects against a black panel background to present a blank panel. As shown in FIG. 8, certain of the changeable indicators have been energized to call for the display of the numeral "2," thus causing a rotation of their respective balls 18 so that their white hemisphere aspects are now visible through their respective openings 40. Thus, the numeral "2" is clearly outlined in white spheres against a black background.

It can now be seen that any one numerical number or a letter of the alphabet can be displayed on any one character unit panel P merely by energizing the appropriate changeable indicators to form the number or letter desired. A complete billboard display unit can be composed by mounting several such character unit panels P thereon in side-by-side relationship to each other and in rows so that words and numbers can be clearly displayed. Although the complete billboard display unit would be properly flood lighted during darkness, it is proposed to have the white hemisphere portion W of the ball 18 covered with a suitable luminescent reflective type of paint to aid visibility.

Referring now to one form of a means for mounting a changeable indicator of the present invention to a character unit panel P as mentioned above, in FIG. 2 there has been shown a quick detachable mounting means comprising resilient brackets 41 which are fastened to the back of the panel P. These brackets 41 extend longitudinally rearward away from the panel and are provided with prongs 42 at their free ends. The frame member 11 of the changeable indicator is provided with a suitable opening 43 in each of its leg portions. The changeable indicator is mounted to the panel P by inserting same between two of the opposingly biased brackets 41 and forcing it inward until it touches the panel P. At this time the prongs 42 will enter the openings 43 and hold the changeable indicator in position.

With the changeable indicator in its mounted position, the indicator ball 18 will partially protrude into the opening 40 in the panel P. The opening 40 in the panel P is preferably covered by a clear plastic shield 44 which may be cemented or otherwise suitably fastened to the panel P. The complete billboard display panel may form the front wall of a boxlike enclosure so that the various changeable indicators and their associated wiring would be completely enclosed against the weather elements.

Figure 9:
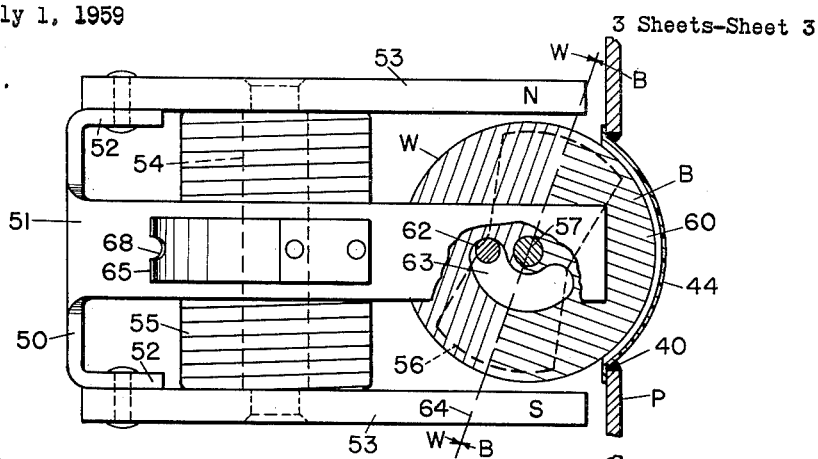
FIG. 9 is a top plan view of the changeable indicator of the second form of the present invention and is shown partially broken away and in relationship to the character unit panel to which it is mounted, the panel being shown in cross section.

Referring now to the changeable indicator device of the second form of the invention as shown in detail in FIGS. 9–11, inclusive, the device is provided with a frame member of non-magnetic material such as bronze or hard brass having resilient characteristics. This frame member comprises a cross shaped base portion 50, the ends of which terminate in two long legs 51 and two short legs 52, which legs extend laterally at right angles to the base portion 50. Pole pieces 53 of soft iron are suitably fastened to the two short legs 52 and extend laterally in the same direction as, and to a length a little less than the length of the two long legs 51.

An iron core piece 54 extends between and is fastened to the two pole pieces 53 at a location near the ends attached to the two short legs 52 of the frame member and provides a yoke therebetween. A coil winding 55 is mounted on the core piece 54. The other free ends of the pole pieces 53 act as magnetic poles and cooperate with a permanent magnet armature 56 which is pivotally mounted on a shaft pin 57 which in turn is mounted in, and extends between, the free ends of the two long legs 51 of the frame member. The shaft pin 57 has its shouldered ends 58 mounted in holes in the legs 51 and can be placed in position merely by springing apart the ends of the legs 51.

Figure 4:
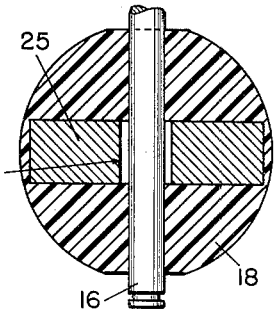
FIG. 4 is a transverse sectional view of the ball element of the changeable indicator shown in FIG. 3 and is taken on the line 4—4 of FIG. 3 as viewed in the direction of the arrows.

The movable indicating unit of the changeable indicator device consists of a molded plastic ball 60 having the permanent magnet armature 56 molded therein in a manner similar to that already explained in connection with the first main form of the invention and shown in FIGS. 3 and 4. The indicator unit as a whole is rotatably mounted on the shaft pin 57 with nylon thrust washers 61 inserted between the plastic ball 60 and the legs 51 on each side. A stop pin 62 is fastened in the upper leg 51 of the frame member and extends downwardly into an arc shaped groove 63 formed in the top of the plastic ball 60. The limitations of the groove 63 act to limit the rotary movement of the ball 60 and is preferably about one hundred and forty degrees for reasons previously mentioned. This stops the ball 60 in each extreme operated position about twenty degrees short of full normal magnetic alignment which the action of the pole pieces 53 and the permanent magnet armature 56 is trying to accomplish.

Also, as previously mentioned in connection with the first form of the invention, the indicating ball 60 has one black hemisphere B and its other hemisphere W is white as indicated by the bisecting dash line 64. Thus, with the changeable indicator unit mounted on the panel P as shown, a different color indication will appear in the opening 40 in the panel in accordance with the operated position of the indicating ball 60.

A modified form of quick detachable mounting means has also been illustrated in connection with this second form of the invention. As shown in FIGS. 10 and 11, this mounting means comprises resilient spring fingers 65 which cooperate with the threads 66 on studs 67. The studs 67 are suitably fastened in the panel P and project rearwardly from the back of the panel P and in vertical alignment with the legs 51, and have the threaded portion 66 on their free ends. The resilient spring fingers 65 are suitably mounted on the outer surfaces of the two legs 51 of the frame member and project rearwardly in vertical alignment with the studs 67. The free ends of the spring fingers 65 are curved outwardly away from their supporting legs 51 and are normally biased towards their respective cooperating studs 67. The outer ends of these spring fingers 65 are also provided with arcuate shaped notches 68, the edges of which contact the threads 66 on the studs 67 when the changeable indicator device is mounted in position against the back of the panel P, with its indicator ball 60 protruding into its associated opening 40. Thus, when the changeable indicator device is slid into position between a pair of the studs 67, the spring fingers 65 contact the studs 67 and are forced towards each other against their normal bias which produces the necessary holding force to maintain the changeable indicator device in position against the back of the panel P.

Referring now to the mode of operation of the changeable indicator device of this second form of the invention, FIG. 12 illustrates a schematic showing of the magnetic structure of the device in its normal black aspect position with energizing current still applied to the coil winding 55. Although in principle the operation of this form of indicator device is similar to the first form shown and described in connection with FIGS. 5 and 6, it should be noted that this second form provides two pole pieces in the magnetic structure which magnetically cooperate at the same time with the two poles of the permanent magnet armature 56. This provides smoother and more positive operation as there are two attracting poles and two repelling poles created each time the polarity is reversed to operate the armature 56 and its associated indicator ball 60 to one or the other of its indicating positions. Also, both poles of the permanent magnet armature 56 are attracted to their respective cooperating pole pieces 53 to create improved holding forces which retain the indicator ball 60 in its last operated position when the coil winding 55 is deenergized.

As shown in FIG. 12, the contacts 69 and 70 of the three position polar control relay CRB were operated to their left-hand positions by reason of the polarity of the current passing through its winding. Thus, an energizing circuit for the coil winding 55 was completed which caused a magnetic flux movement through the core 54 and the pole pieces 53 in the direction indicated by the arrows to attract the south and north poles S and N respectively of the permanent magnet armature 56 to the north and south poles N and S respectively of the pole pieces 53. This action caused the armature 56 and its associated indicator ball 60 to rotate in a counter clockwise direction to its black aspect position as shown, as determined by the stop pin 62 and the limitations of the arcuate shaped groove 63 as previously explained.

When energy is removed from the winding of the control relay CRB the coil winding 55 of the changeable indicator device will be deenergized and cause the pole pieces 53 to lose their polarity. However, as the armature 56 is in itself a permanent magnet, it will remain attracted in its last operated position and retain its associated indicator ball 60 in its then indicating position so long as the coil winding 55 remains deenergized.

As previously explained in connection with the operation of the first form of the indicator as shown in FIGS. 5 and 6, the operation of this double pole form of the indicator shown in FIG. 12 to its other or white aspect position is also accomplished merely by reversing the polarity of the energizing current pasing through the winding of the control relay CRB. This causes a reverse magnetic flux movement through the core 54 which reverses the positions of the north and south poles N and S of the magnetic structure from that shown in FIG. 12, thus causing the permanent magnet armature 56 and its associated indicator ball 60 to rotate to its other position.

The magnetic structure of this second form of the invention may be modified to include two separate coil windings instead of one as shown, in a similar manner as was done with the first form of the invention. The two coil windings would be mounted on the same core 54. The operation would be similar to that shown and described in connection with FIG. 7.

From the foregoing description with reference to the drawings, it should be seen and understood that a changeable indicator of either of the forms of the present invention provides a simple and economical device which is readily adaptable to various types of display devices. It may be used as a single unit or be used in multiple quantities and is constructed to permit various types of multiple mounting in close proximity. The display indication is such that it may be made to be visible both by day or night. Also, the indication displayed remains in its last display position without the use of energy or any other manual help, yet may readily be electrically operated to change the indication as desired.

Having thus shown and described two specific forms which the present invention can assume and the manner in which it is to be performed and the utility thereof, it is desired to be understood that such forms and application thereof were chosen more for the purpose of illustrating the principles and mode of operation rather than for indicating the full scope, thereof. It should be further understood that various other modifications, adaptations and alterations may be applied to the specific forms shown within the scope of the present invention, except as limited by the appended claims.

What I claim is:

1. A changeable indicator for a character display unit comprising, an electromagnetic device having a U-shaped frame member, a ball indicator having first and second distinctive hemispheres and possessing peripheral stop means, a permanent bar magnet molded within said ball indicator rotatably mounted between the extremities of said U-shaped frame member, stop means mounted on said U-shaped frame member, said electromagnetic device being effective when energized with one polarity to operate said permanent bar magnet to a first limiting position determined by said stop means on said ball indicator engaging said stop means on said U-shaped frame member for rendering said ball indicator effective to display a first distinctive hemisphere and said electromagnetic device being effective when energized with the opposite polarity to operate said permanent bar magnet to a second limiting position determined by said stop means on said ball indicator engaging said stop means on said U-shaped frame member for rendering said ball indicator effective to display a second distinctive hemisphere, said permanent bar magnet magnetically cooperating with said electromagnetic device to hold said ball indicator in its last operated display position when said electromagnetic device is deenergized.

2. A changeable indicator for a character display unit comprising, a generally U-shaped frame member having spaced extending legs and a bight portion, an electromagnet attached at one end to said bight portion extending between and substantially parallel to said extended legs, a pole piece connected to the opposite end of said electromagnet, a circuit connected to said electromagnet to selectively energize said pole piece with energy of opposite polarity, a magnetizable pin connected at opposite ends of said legs and spaced from said pole piece, a plastic ball indicator possessing first and second distinctive hemispheres and positioned so that the peripheral surface of said ball indicator is adjacent to but spaced from said pole piece, a permanent bar magnet molded in said ball indicator and mounted on said pin in such position that the opposite ends thereof rotate with said ball indicator in a plane normal to its axis, said permanent magnet being operative to rotate said ball indicator to diametrically opposite positions in accordance with the polarity of said pole piece, said frame member and said bar magnet providing a path for said magnetic flux, a pair of spacedly fixed diametrically opposite stop pins attached to said frame member and a pin extending radially from said ball indicator to engage against said stop pins selectively in accordance with the polarity of said pole piece to limit the rotation of said ball indicator whereby said ball indicator is rendered effective to selectively display a first and second distinctive hemisphere in accordance with the polarity of the pole piece of said electromagnet and said bar magnet magnetically cooperating with said pole piece to hold said ball indicator in its last rotated limiting position when said electromagnet is deenergized.

3. A changeable indicator for a character display unit comprising, a non-magnetizable frame member having two intersecting bight portions the opposite ends of which terminate in two long legs and two short legs extending laterally from said bight portions, two pole pieces connected to said short legs of said frame member extending laterally in the same direction as said long legs, an electromagnet connected to and extending transversely between said pole pieces and spaced from said bight portion connected to said short legs, a circuit connected to said electromagnet to selectively energize said pole pieces with energy of opposite polarity, a shaft pin mounted between the free ends of said two long legs of said frame member, a plastic ball indicator having an arc shaped groove on its periphery and possessing first and second distinctive hemispheres, a permanent bar magnet molded on said ball indicator rotably mounted on said shaft pin in such position that the opposite ends of said bar magnet rotate with said ball indicator in a plane normal to its axis, said permanent magnet being operative to rotate said ball indicator to diametrically opposite positions in accordance with the polarity of said pole pieces, a stop pin located on one of said long legs of said frame member adapted to engage said arc shaped groove to limit the rotation of said ball indicator in accordance with the polarity of said pole pieces whereby said ball indicator is rendered effective to selectively display a first and second distinctive hemisphere in accordance with the polarity of said pole pieces of said electromagnet and said bar magnet magnetically cooperates with said pole pieces to hold said ball indicator in its last rotated limiting position when said electromagnet is deenergized.

References Cited in the file of this patent

UNITED STATES PATENTS

| | | |
|---|---|---|
| 1,850,175 | Kenerson | Mar. 22, 1932 |
| 2,047,632 | Hopp | July 14, 1936 |
| 2,415,452 | Taylor et al. | Feb. 11, 1947 |
| 2,585,974 | Taylor et al. | Feb. 19, 1952 |
| 2,632,888 | Brookes | Mar. 24, 1953 |
| 2,740,955 | Barrett et al. | Apr. 3, 1956 |
| 2,836,773 | Sckrobisch | May 27, 1958 |

FOREIGN PATENTS

| | | |
|---|---|---|
| 687,604 | Great Britain | Feb. 18, 1953 |